United States Patent
Amies et al.

(10) Patent No.: US 9,122,510 B2
(45) Date of Patent: Sep. 1, 2015

(54) QUERYING AND MANAGING COMPUTING RESOURCES IN A NETWORKED COMPUTING ENVIRONMENT

(71) Applicant: International Business Machines Corporation, Armonk, NY (US)

(72) Inventors: Alexander P. Amies, Beijing (CN); Andrzej Kochut, Croton on Hudson, NY (US); Guo Ning Liu, Beijing (CN); Randy A. Rendahl, Raleigh, NC (US); Yi Shuai Wang, Beijing (CN); Chun Feng Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 13/733,012

(22) Filed: Jan. 2, 2013

(65) Prior Publication Data
US 2014/0189125 A1    Jul. 3, 2014

(51) Int. Cl.
| | |
|---|---|
| G06F 13/00 | (2006.01) |
| G06F 9/455 | (2006.01) |
| G06F 9/50 | (2006.01) |
| H04L 29/08 | (2006.01) |
| H04L 29/06 | (2006.01) |

(52) U.S. Cl.
CPC .......... G06F 9/45558 (2013.01); G06F 9/5072 (2013.01); H04L 67/00 (2013.01); H04L 67/025 (2013.01); H04L 69/18 (2013.01)

(58) Field of Classification Search
CPC ....... H04L 67/00; H04L 67/025; H04L 69/18; G06F 9/45558; G06F 9/5072
USPC .......... 709/201, 226, 223; 718/102, 104, 105
See application file for complete search history.

(56) References Cited

U.S. PATENT DOCUMENTS

| | | | |
|---|---|---|---|
| 8,037,187 B2 | 10/2011 | Dawson et al. | |
| 8,250,215 B2 | 8/2012 | Steinhans et al. | |
| 8,260,931 B2 | 9/2012 | Balasubramanian et al. | |
| 8,261,295 B1 | 9/2012 | Risbood et al. | |
| 2004/0260818 A1* | 12/2004 | Valois et al. | 709/229 |
| 2006/0218551 A1* | 9/2006 | Berstis et al. | 718/102 |
| 2010/0042720 A1 | 2/2010 | Stienhans et al. | |
| 2010/0169492 A1* | 7/2010 | Lee | 709/226 |
| 2011/0055712 A1* | 3/2011 | Tung et al. | 715/738 |
| 2011/0126197 A1 | 5/2011 | Larsen et al. | |

(Continued)

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Kenneth R Coulter
(74) *Attorney, Agent, or Firm* — William E. Schiesser; Keohane & D'Alessandro PLLC; Hunter E. Webb

(57) ABSTRACT

An approach for querying and managing/manipulating network computing resources (e.g., cloud computing resources) is provided. Typically, an interpreter component may be implemented so that a language describing such computing resources may be interpreted. The interpreter component may include other components such as a request processor, a provisioning queue, an execution engine, a results store, and response marshaller/handler that collaborate to manage the computing resources. Such computing resources may, for example, include virtual machine instances, virtual machine images, storage volumes, network resources, files, software bundles, etc.

25 Claims, 8 Drawing Sheets

(56) References Cited

U.S. PATENT DOCUMENTS

| | | |
|---|---|---|
| 2011/0138055 A1* | 6/2011 | Daly et al. ............... 709/226 |
| 2011/0145392 A1 | 6/2011 | Dawson et al. |
| 2011/0231525 A1 | 9/2011 | Balani et al. |
| 2011/0270803 A1 | 11/2011 | Chou et al. |
| 2011/0320605 A1* | 12/2011 | Kramer et al. .......... 709/226 |
| 2014/0012988 A1* | 1/2014 | Kruempelmann ........ 709/226 |

OTHER PUBLICATIONS

Mell, P. et al., "The NIST Definition of Cloud Computing", National Institute of Standards and Technology, Information Technology Laboratory, Version 15, Oct. 7, 2009, 2 pages.

* cited by examiner

QUERYING AND MANAGING COMPUTING RESOURCES IN A NETWORKED COMPUTING ENVIRONMENT

TECHNICAL FIELD

Embodiments of the present invention relate to computing resource management. Specifically, embodiments of the present invention relate to the querying and management of computing resources in a networked computing environment (e.g., a cloud computing environment).

BACKGROUND

The networked computing environment (e.g., a cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Typically, cloud consumers interact with cloud environments (e.g., Infrastructure as a Service (IaaS) environments) manually via user interface(s) and command line(s), or programmatically via application programming interfaces and individual resources. Challenges may exist, however, in that such approaches may not be optimal for being dynamically embedded/implemented in virtual machine images and/or tools (e.g., installation scripts, network tools, etc.) that are presently utilized in cloud environments. As such, existing approaches may be less efficient and/or less accurate.

SUMMARY

In general, embodiments of the present invention provide an approach for querying and managing/manipulating network computing resources (e.g., cloud computing resources). In a typical embodiment, an interpreter component may be implemented so that a language describing the computing resources may be interpreted. The interpreter component may include other components such as a request processor, a provisioning queue, an execution engine, a results store, and response marshaller/handler that collaborate to manage the computing resources. Such computing resources may, for example, include virtual machine instances, virtual machine images, storage volumes, network resources, files, software bundles, etc.

A first aspect of the present invention provides a computer-implemented method for querying and managing computing resources in a networked computing environment, comprising: receiving, in a computer memory medium, a request to provision a set of computing resources; extracting an expression from the request; analyzing text of the expression and generating a tree structure based on the text; iterating over a set of elements of the tree structure to resolve a set of queries of the request; submitting a set of jobs to a provisioning queue based on the iterating; processing the set of jobs to fulfill the request; and storing a set of results of the processing in a results store.

A second aspect of the present invention provides a system for querying and managing computing resources in a networked computing environment, comprising: a bus; a processor coupled to the bus; and a memory medium coupled to the bus, the memory medium comprising instructions to: receive, in a computer memory medium, a request to provision a set of computing resources; extract an expression from the request; analyze text of the expression and generate a tree structure based on the text; iterate over a set of elements of the tree structure to resolve a set of queries of the request; submit a set of jobs to a provisioning queue based on the iterating; process the set of jobs to fulfill the request; and store a set of results of the processing in a results store.

A third aspect of the present invention provides a computer program product for querying and managing computing resources in a networked computing environment, the computer program product comprising a computer readable storage media, and program instructions stored on the computer readable storage media, to: receive, in a computer memory medium, a request to provision a set of computing resources; extract an expression from the request; analyze text of the expression and generate a tree structure based on the text; iterate over a set of elements of the tree structure to resolve a set of queries of the request; submit a set of jobs to a provisioning queue based on the iterating; process the set of jobs to fulfill the request; and store a set of results of the processing in a results store.

A fourth aspect of the present invention provides a method for deploying a system for querying and managing computing resources in a networked computing environment, comprising: providing a computer infrastructure being operable to: receive, in a computer memory medium, a request to provision a set of computing resources; extract an expression from the request; analyze text of the expression and generate a tree structure based on the text; iterate over a set of elements of the tree structure to resolve a set of queries of the request; submit a set of jobs to a provisioning queue based on the iterating; process the set of jobs to fulfill the request; and store a set of results of the processing in a results store.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION

Figure 1:
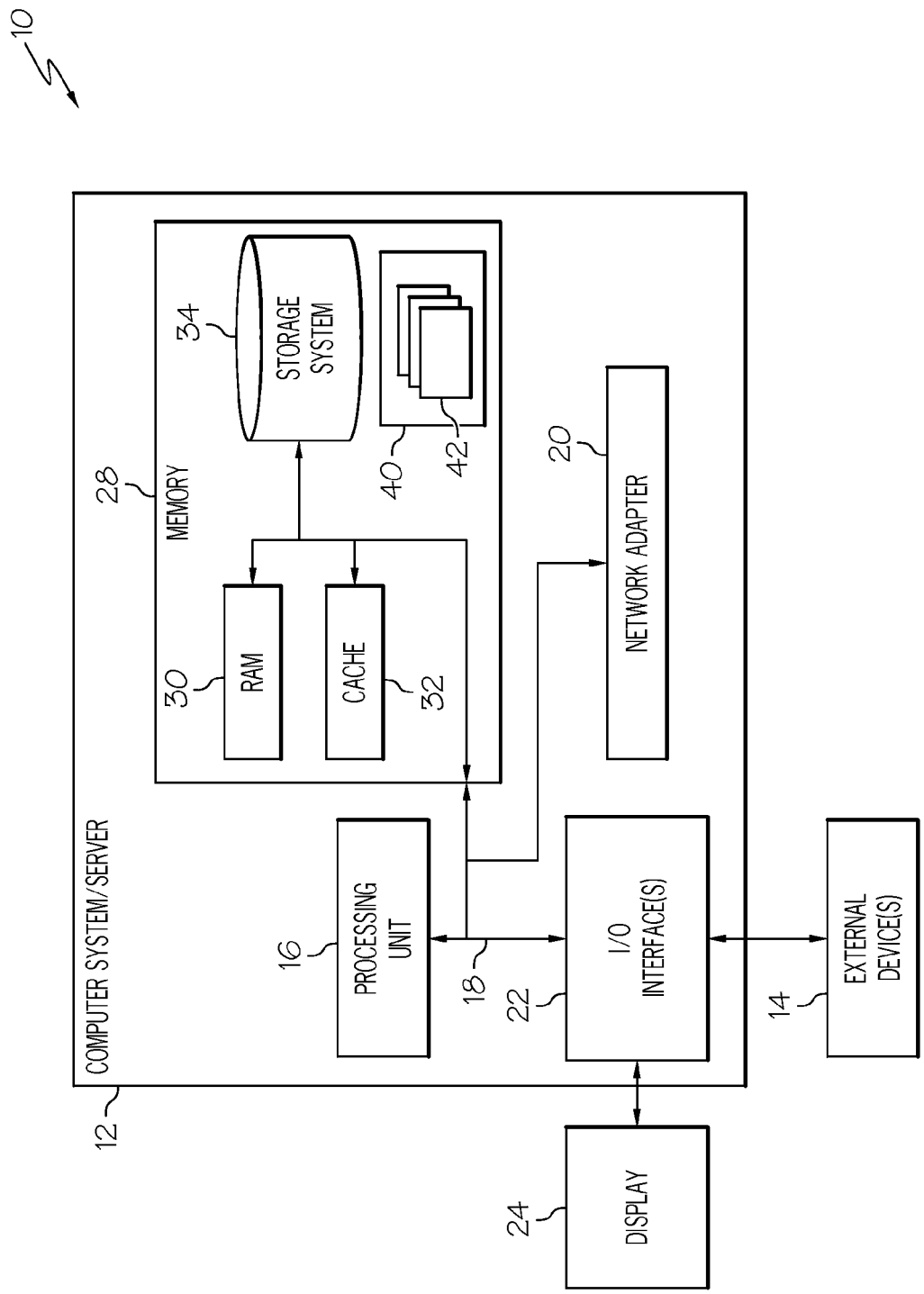
FIG. 1 depicts a cloud computing node according to an embodiment of the present invention.

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for querying and managing/manipulating network computing resources (e.g., cloud computing resources). In a typical embodiment, an interpreter component may be implemented so that a language describing the computing resources may be interpreted. The interpreter component may include other components such as a request processor, a provisioning queue, an execution engine, a results store, and response marshaller/handler that collaborate to manage the computing resources. Such computing resources may, for example, include virtual machine instances, virtual machine images, storage volumes, network resources, files, software bundles, etc.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
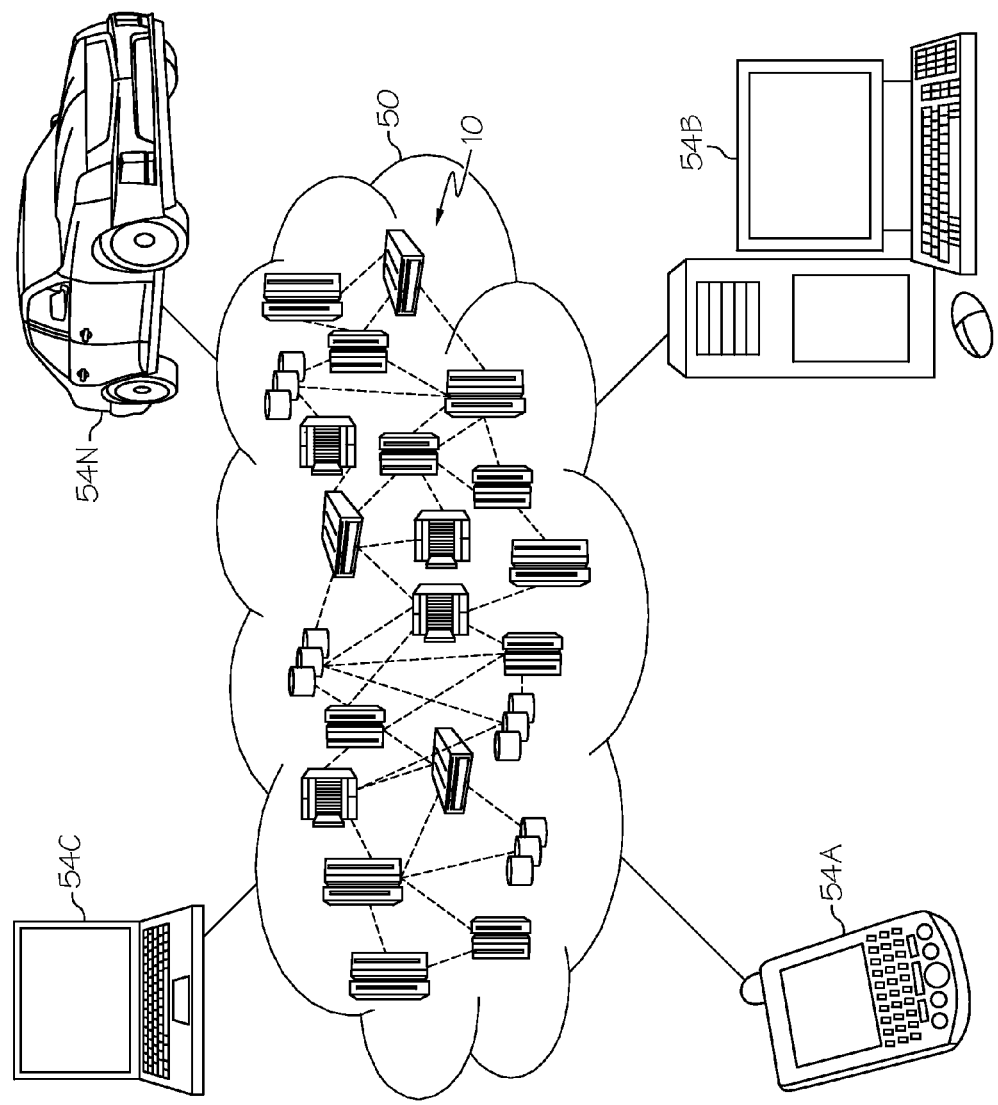
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
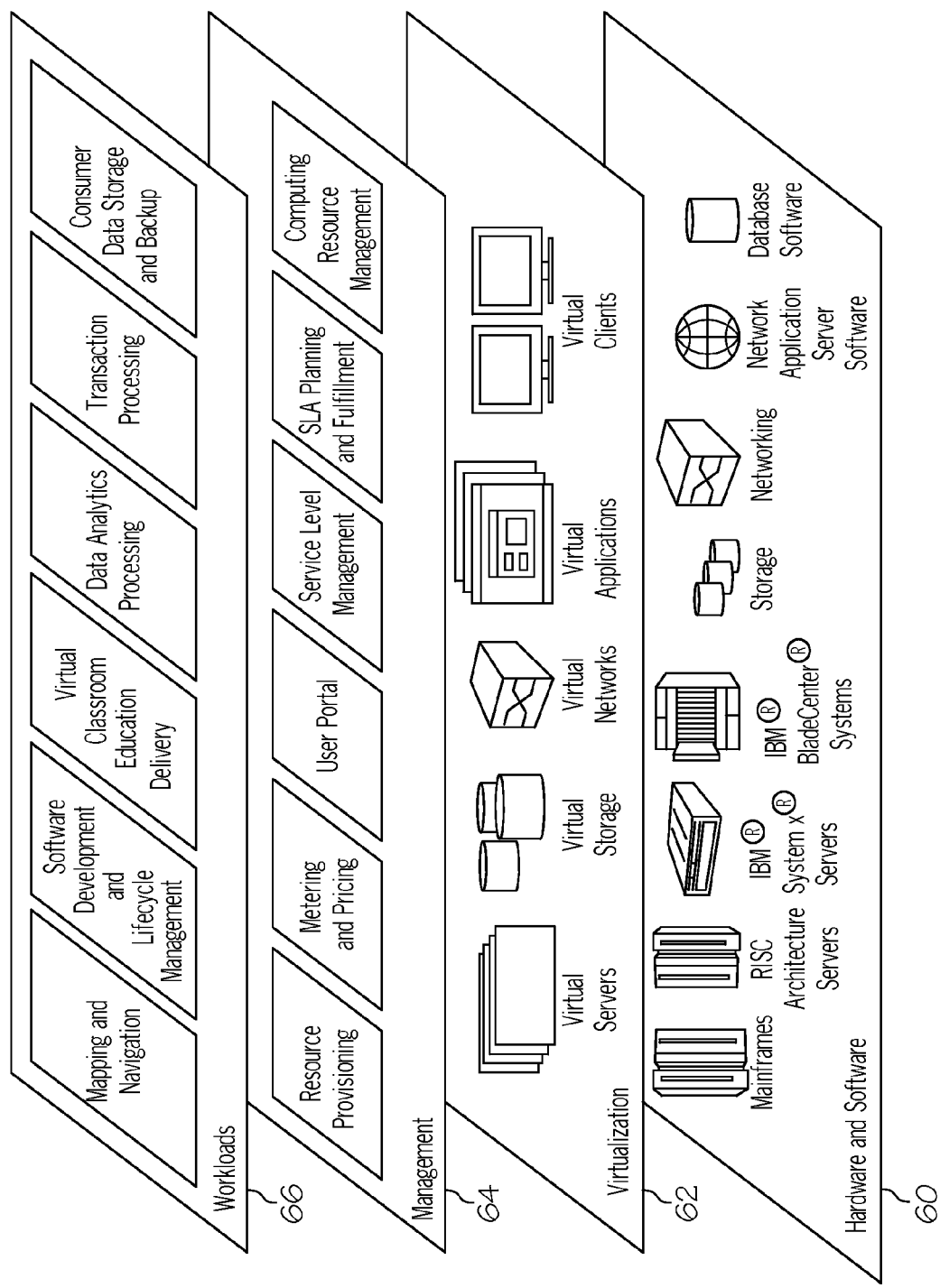
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is computing resource management, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the computing resource management functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
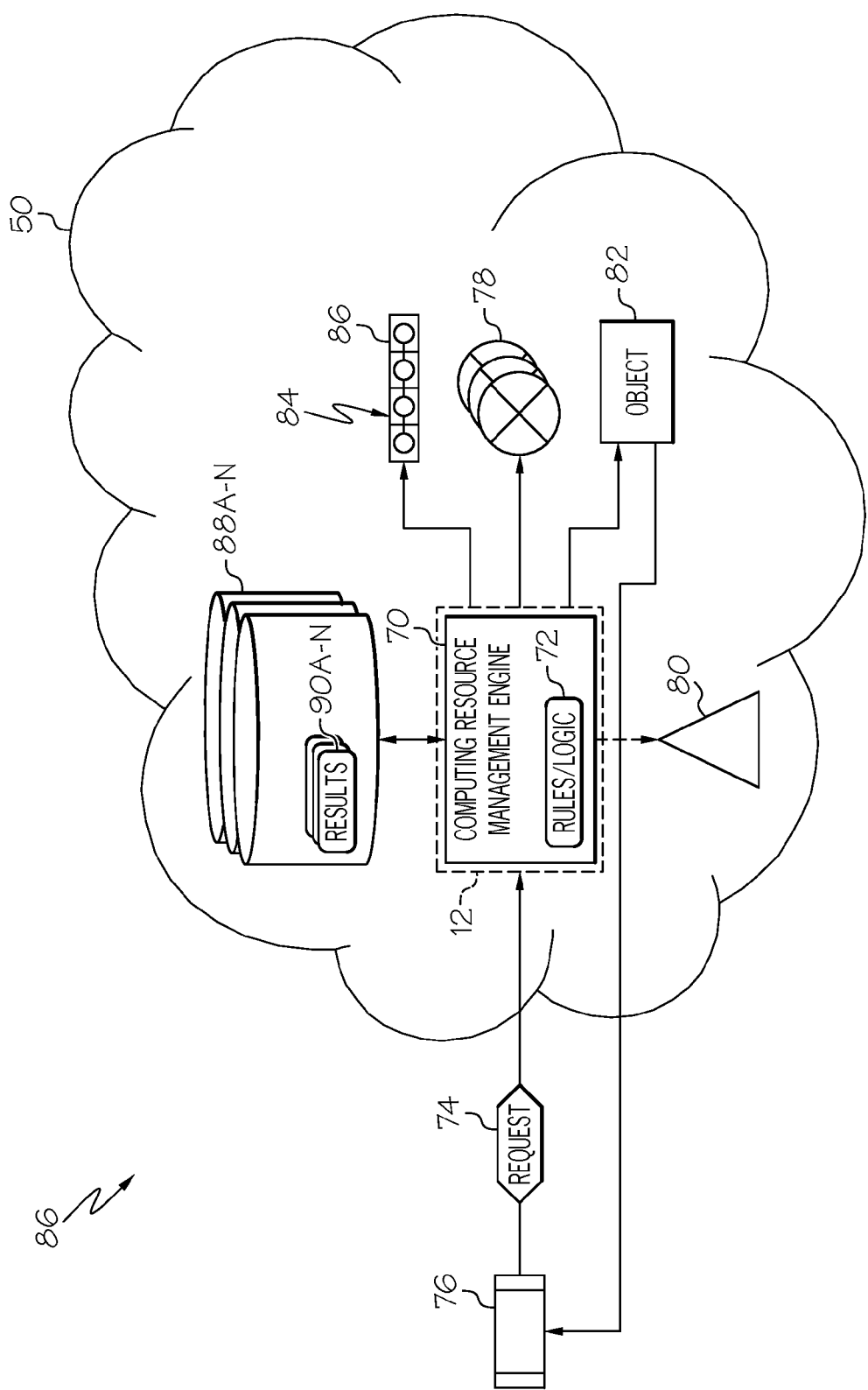
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50).

A computer system/server 12, which can be implemented as either a stand-alone computer system or as a networked computer system is shown in FIG. 4. In the event the teachings recited herein are practiced in a networked computing environment 86, each client need not have a computing resource management engine (engine 70). Rather, engine 70 could be loaded on a server or server-capable device that communicates (e.g., wirelessly) with the clients to provide computing resource management therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides computing resource management hereunder.

Along these lines, engine 70 may perform multiple functions similar to a general-purpose computer. Specifically, among other functions, engine 70 may (among other things): receive, in a computer memory medium (e.g., memory 28 of FIG. 1), a request 74 (e.g., via a user script 76 or a device executing the same) to provision a set of computing resources 78; extract an expression from the request 74; convert the expression to a text format; analyze text of the expression and generate a tree structure 80 based on the text; iterate over a set of elements of the tree structure to resolve a set of queries of the request 74 (e.g., process a query and retrieve information from a database or the like); submit a set of jobs 84 to a provisioning queue 86 based on the iteration; reference a location in the provisioning queue 86 where the processing of the set of jobs 84 should commence; process the set of jobs 84 to fulfill the request 74; evaluate any dependencies between the set of jobs 84 in the provisioning queue 86, wherein an order of the queue 86 is established to maintain the dependencies; store a set of results 90A-N of the processing in a results store 88A-N (e.g., computer storage medium/device); monitor statuses of the set of jobs 84 in the provisioning queue 86; evaluate whether changes in the statuses enable subsequent provisioning actions; collect the set of results 90A-N from the results store 88A-N; package the set of results 90A-N as a response result object 82; send the response result object 82 to the user script 76 (e.g., a device executing user script 76).

In general, the embodiments described herein provide multiple optimizations from a user's perspective. For example, the embodiments may be used by a script writer to manage cloud resources with software included completely with various operating systems, not requiring additional software on the client side. Moreover, the embodiments may accept input from the output of commonly used tools in cloud computing such as secure shell (SSH), secure copy (SCP), network utilities, etc. Still yet, output of expressions in the resource expression language described herein may be used as input to other cloud computing utilities. In addition, the resource expression language can be embedded in scripting and programming languages. These teachings may model an asynchronous nature of processes related to cloud resources when provisioning sets of resources, such as IP addresses and storage volumes that are associated with virtual machines. Similarly, these teachings may model user preferences for use of cloud resources to simplify.

Along these lines, an execution engine will be described below to perform some or all of the teachings recited herein. Internal optimizations of the execution engine include (among other things):

1. A capability to inject files into virtual machine images before starting the virtual machine. The execution engine is optimized to retrieve the files from a central asset repository via translation of the query and manipulation/management language into an asset manager such as IBM Rational® Asset Manager (IBM, Rational, and related terms are trademarks of International Business Machines Corporation in the United States and/or other countries). This optimization may help preserve the privacy of the virtual machine owner of any runtime data.

2. The capability to provision resources in an optimal order. Dependency constraints built in the resource expression language and model allow the execution engine to provision resources in the correct order. The chaining structure of the language allows sequential operations to be optimized based on changes in the state of the resources during provisioning of the different resources within a complex request. The interpretation of timing related keywords in the input expression allows the most rapid way to complete the overall request.

3. A system of defaults such that if a user does not provide sufficient information for the complete request to succeed, then the defaults may be utilized.

Figure 5:
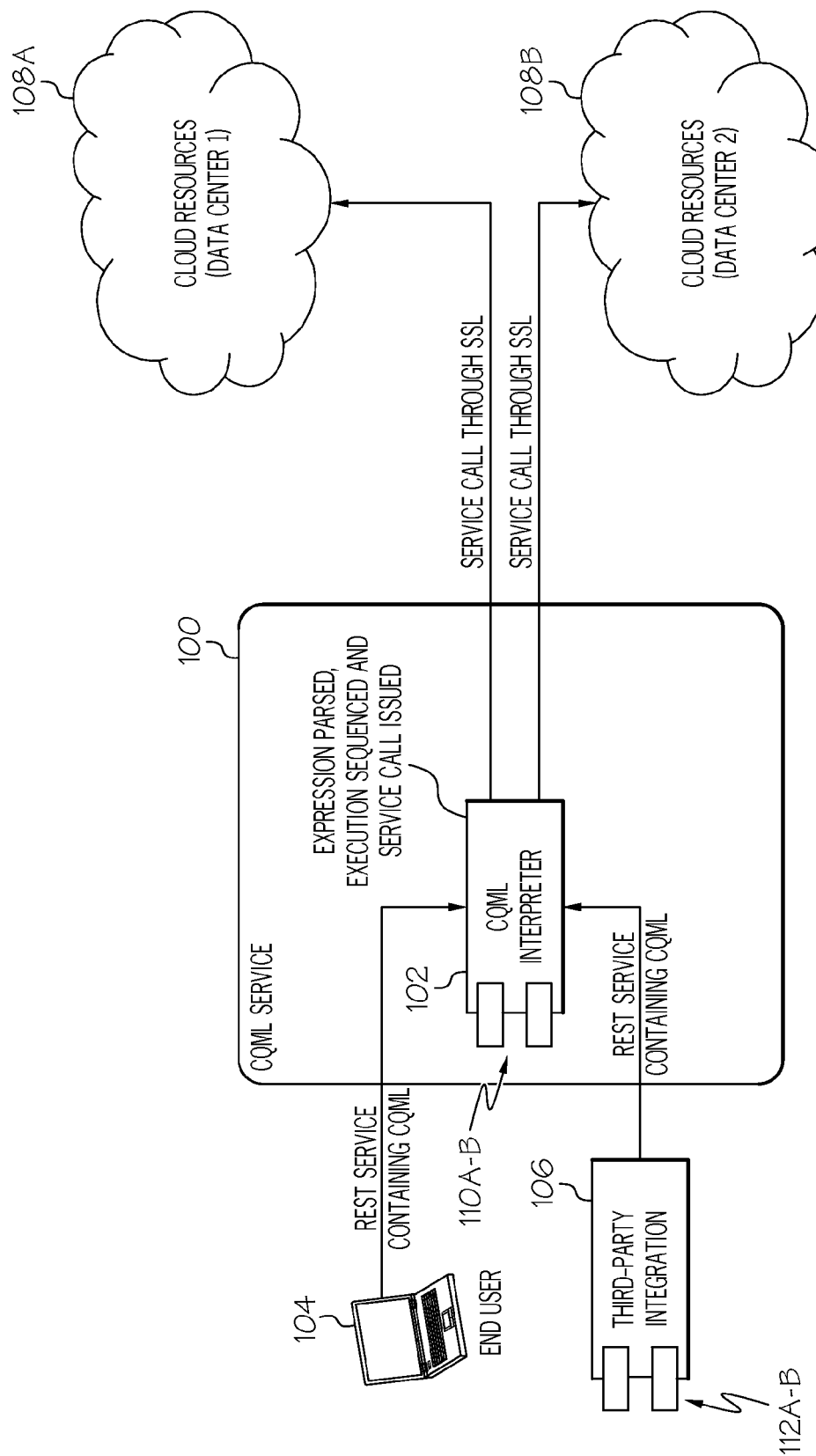
FIG. 5 depicts another system diagram according to an embodiment of the present invention.

Referring now to FIG. 5, a system diagram describing a context of an embodiment according to an illustrative implementation of the present invention is shown. It is understood that the terminology and/or architectures utilized in conjunction with FIG. 5 (and FIG. 6) are utilized to provide an illustrative example and are not intended to be limiting. Moreover, any of the components of FIGS. 5 and 6 may be implemented via program 40 of FIG. 1, and/or engine 70 of FIG. 4. As shown, a cloud query and manipulation language (CQML) service 100 is shown that allows end user 104 and third parties 106 (having APIs 112A-B) to call cloud management representational state transfer (REST) API's 110A-B remotely. The expressions may be parsed and executed in a CQML interpreter 102, which communicates remotely to one or more cloud data centers hosting cloud resources 108A-B. This tool may determine the output (e.g., format) so that key information can be extracted and fed into the other tools. This may be done with the CQML (language).

Examples of possible expression are listed in the table below (e.g., to find an Internet protocol (IP) address of a virtual machine with name "My VM"):

| Expression | Example Output | Explanation |
|---|---|---|
| instance.get where instance.name="My VM'" return instance.ip | 111.222.333.44 | Find the IP address of the virtual machine instance with name "My VM" |
| instance.get where instance.name="My VM'" return instance.id | i12345 | Find the ID of the virtual machine instance with name "My VM" |
| until instance.state="ACTIVE" | None | Wait until the state becomes active |
| credential.post where credential.name="My Key" return credential.private_key | Private key | Create the credential and return the private key |
| instance.post where credential.name="My Key" instance.name="My VM" return instance.id | i12345 | Create an instance with credential named "My Key" and instance name "My VM", return the ID of the instance |

Using these expressions, the embodiments described herein may script operations together and integrate with existing command line tools. For example, the "Bash" script below generates a credential and saves a private key, creates a virtual machine instance with the key, waits until the instance has been provisioned and becomes active, discovers the IP address and then copies the system log from the machine to the local machine where the script is executing. The commands/script below describes these concepts:

!/bash/bin
Create the credential and put the private key in a file in the user's directory curl $BASE_URL/resource?expression='credential.post where credential.name="My Key" return credential.private_key'>~/.ssh/newkey
Create the virtual machine instance and put the ID in the script variable 'instance_id'instance_id=$(curl BASE_URUresource?expression='instance. post where credential.name="My Key" instance.name="My VM" return instance.id')
Wait until the status of the virtual machine becomes active curl $BASE_URL/resource?expression=luntil instance.status-n "My VM"-s ACTIVE'
Get the IP address of the virtual machine and put it in the script variable 'ip' ip=$(curl $BASE_URL/resource?expression='instance.get where name="My VM" return instance.ip')
Use the key and IP address as input into the SCP command to copy the log file scp-i-~/.ssh/newkey idcuser@$ip:/var/log/log In the commands above, '$BASE_URL' is the URL of a Cloud REST API used to invoke operations on the cloud resource expression interpreter described herein. In general, the expression language may be implemented as an extension to a REST service for management of cloud resources. A typical method of connecting to cloud management platforms is REST. Most programming and scripting languages can execute REST requests, and so such languages may likely be able to consume the expression language.

Figure 6:
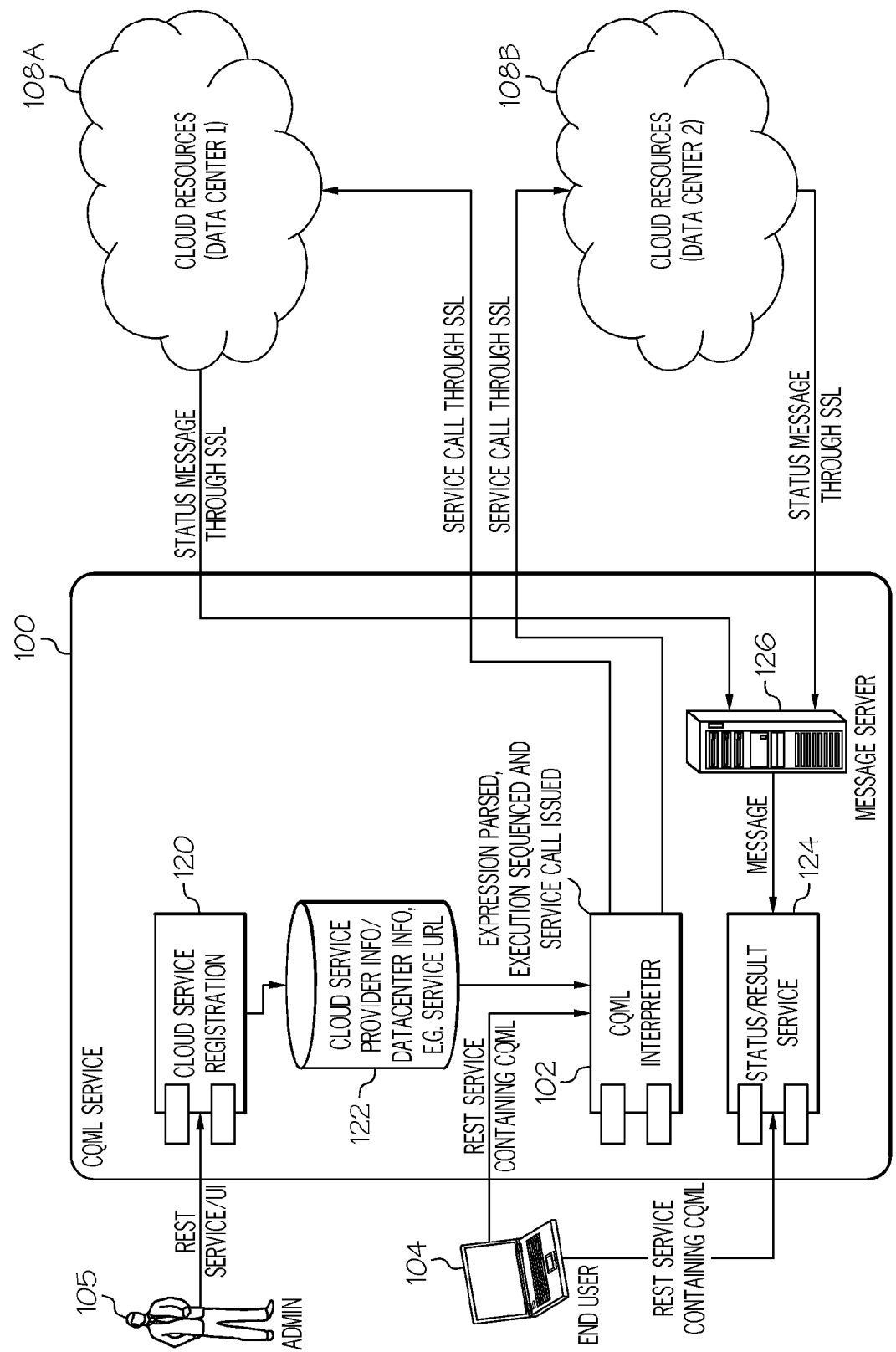
FIG. 6 depicts another system diagram according to an embodiment of the present invention.

A higher level system diagram describing these concepts is shown in FIG. 6. Similar to FIG. 5, CQML service 100 receives communications from an end user 104 (e.g., REST service information) and/or an administrator 105 (e.g., REST service containing CQML) and communicates with cloud resources 108A-B (e.g., service calls though secured socket language (SSL), status messages, etc.). As further shown, however, CQML service 100 may also include a cloud service registration component 120 for registering cloud (e.g. REST)

services, a data store 122 (e.g., having cloud service provider information, datacenter information, etc.), and a status/result service component 124 for receiving status messages via message server 126.

Figure 7:
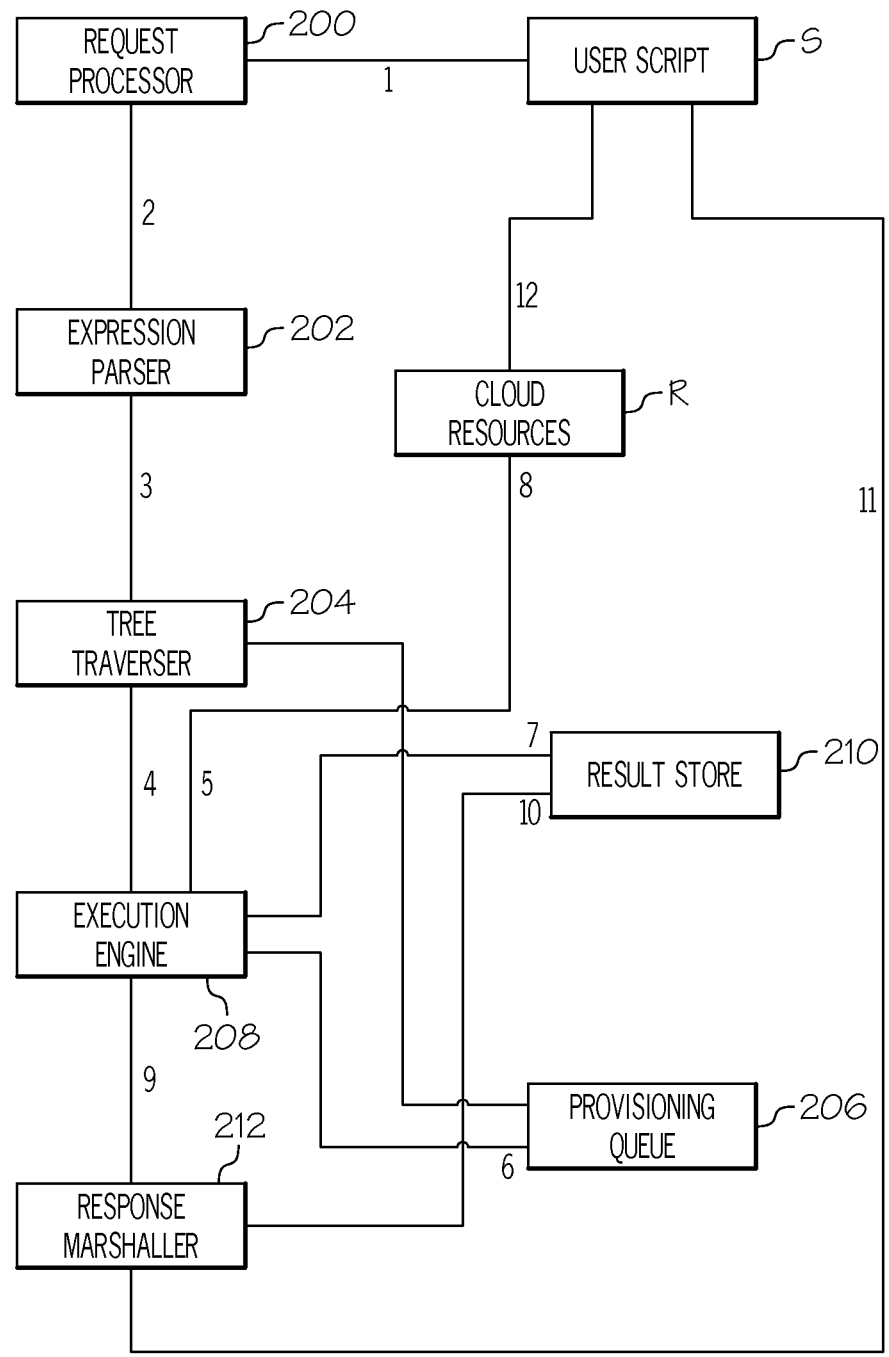
FIG. 7 shows a process flow diagram according to an embodiment of the present invention.

Referring now to FIG. 7, a component flow diagram according to an embodiment of the present invention is shown. In general, FIG. 7 depicts at least some of the processes implemented via expression interpreter 102 of FIGS. 5-6. In general, expression interpreter 102 may include the following components: a request processor 200 for accepting the REST request from user script S (shown as script 76 in FIG. 4) and invoking an expression parser 202 for parsing the expression language into an expression tree; tree traverser 204 for traversing the expression tree, performing queries needed, and generating provisioning requests for cloud resources "R" (shown as resources 78 in FIG. 4); a provisioning queue 206 (shown as queue 86 in FIG. 4) for storing resource provisioning requests, and generating events when the status of individual provisioning requests change; an execution engine 208 for polling provisioning queue 206 and removing individual requests; a results store 210 (shown as results store(s) 84A-N of FIG. 4) for storing intermediate and final results of the expression evaluation; and a response marshaller/handler 212 for collecting results from results store 210, and returning the result to the client in text form.

As further shown in FIG. 7, the following steps may be implemented by CMQL interpreter 102 (e.g., by the components thereof):

1. A user script submits a request to the expression interpreter 102 and request processor 200 receives the request.
2. Request processor 200 extracts the expression from the HTTP request and invokes expression parser 202 passing expression in text form.
3. Expression parser 202 scans the expression text and creates a tree that describes the structure of the expression. Expression parser 202 then invokes tree traverser 204 passing the expression tree.
4. Tree traverse 204 iterates over the element(s) in the tree, resolving any queries in the expression.
5. Tree traverse 204 then submits jobs to provisioning queue 206 for the provisioning actions needed. Dependencies are evaluated and the order of jobs in provisioning queue 206 is arranged such that dependencies are maintained. When complete, tree traverse 204 invokes execution engine 208 passing a reference to the location of provisioning queue 206 that execution should begin.
6. Execution engine 208 processes jobs in provisioning queue 206 waiting for asynchronous requests to complete. The execution constantly monitors provisioning queue 206 for changes in status of the jobs and evaluates whether the changes in status may enable subsequent provisioning actions to be taken.
7. Execution engine 208 interprets the results of requests and places these in results store 210.
8. When provisioning requests are complete the cloud resources are available.
9. When all the provisioning requests are complete, execution engine 208 passes control to response marshaller/handler 212 to handle the results.
10. Response marshaller/handler 212 collects the results from results store 210 and converts the results to a response result object.
11. Response marshaller/handler 212 sends the response object to the User Script.

In order to make provisioning easier and require fewer discoveries, default flags may be provided on the following objects: credential; subnet; volume configuration; virtual machine configuration; data center; and/or image. If a user does not provide sufficient information for the complete request to succeed, default resources will be used. Queries to resolve these default objects may be resolved by tree traverse 204 (i.e., queries in the request may be processed and/or fulfilled). When set, the default flags may indicate the values to use in provisioning instances, addresses, and volumes. This may reduce the number of steps required to provision resources. When provisioning a new instance, the following default values may be used, if the default flag is set: credential; subnet; virtual machine configuration; virtual device context (VDC); location; and/or image.

As described above, embodiments of the present invention may utilize a programming language referred to herein as CQML. The section below will describe some of the details of CQML. Specifically, the section below will describe illustrative resource language, keywords, and example code that may be implemented hereunder. In general, the language utilized may include of the following elements:

1. Keywords
2. Operators
3. Resources
4. Attributes
5. Methods

Keywords associate resources in expressions. Illustrative keywords are summarized in the table below:

| Keyword | Description |
|---------|-------------|
| Where | Introduces an expression |
| Until | Wait until the following condition is true |
| return | Return the following attribute or resource |

The operators in the language are listed in the table below.

| Operator | Description |
|----------|-------------|
| Equals (==) | Equality |
| != | Not equals |
| ( ) | Group a logical expression or list, call method |
| && | And condition |
| \|\| | Or condition |
| ~ | Matches regular expression |
| !~ | Does not match regular expression |

The resources that can be embedded in the expression language are listed in the table below:

| Resource | Attribute | Symbol |
|----------|-----------|--------|
| Virtual machine instance | ID | instance.id |
| | Primary IP address * | instance.ip |
| | Secondary addresses * | instance.secondaryIP |
| | Hostname | instance.hostname |
| | Name | instance.name |
| | Description | instance.description |
| | Public key * | instance.public_key |
| | State | instance.state |
| | Storage volumes * | instance.volumes |
| | Image ID * | instance.imageID |
| | Data Center ID * | instance.datacenterID |
| | Software Bundles * | instance.bundle |
| Credential | Name | credential.name |
| | Public key | credential.public_key |
| | Private key | credential.private_key |
| | Default | credential.default |

-continued

| Resource | Attribute | Symbol |
|---|---|---|
| Virtual machine image | ID | image.id |
| | Name | image.name |
| | Description | image.description |
| | State | image.state |
| | Tags | image.tags |
| | Default | image.default |
| | Data Center ID * | image.datacenterID |
| | Software Bundles * | image.bundles |
| IP Address | IP address | address.ip |
| | Subnet * | address.subnet |
| | Type (public or private) | address.type |
| | State | address.state |
| | Data Center ID * | image.datacenterID |
| Subnet | ID | subnet.id |
| | Name | subnet.name |
| | Description | subnet.description |
| | Mask | subnet.mask |
| | Default | subnet.default |
| | Data Center ID * | subnet.datacenterID |
| Storage volume | ID | volume.id |
| | Name | volume.name |
| | Description | volume.description |
| | State | volume.state |
| | Data Center ID * | volume.datacenterID |
| Snapshot | ID | snapshot.id |
| | Name | snapshot.name |
| | Description | snapshot.description |
| | Version | snapshot.version |
| | Instance | snapshot.instance |
| | Parent image ID * | snapshot.imageID |
| | Data Center ID * | snapshot.datacenterID |
| | Data Saved | snapshot.dataSaved |
| Data Center | ID | datacenter.id |
| | Name | datacenter.name |
| | Description | datacenter.description |
| | Default | datacenter.default |
| File | Name | file.name |
| Software bundle | URL | file.url |
| | ID | bundle.id |
| | Name | bundle.name |
| | Supported Operating Systems * | bundle.os |
| | Dependent bundles * | bundle.dependencies |

A "*" in the table above indicates that the attribute is a resource dependency. Resources also have methods, as listed in the table below:

| Resource | Support |
|---|---|
| Instance | get, post, put, delete |
| Credential | get, post, put, delete |
| Image | get, post, put, delete |
| Address | get, post, delete |
| Subnet | get, post, put, delete |
| Snapshot | get, post, put, delete |

The association of keywords with resource attributes is described by the extended Backus-Naur form (EBNF) grammar below (keywords are in bold):

expression=where_statement|until statement;
 where_statement=resource.method where condition return resource[.attribute];
 condition=expression_or_variable binary_operator expression_or_variable|unary_operator variable_or_variable
  expression_or_variable=expression|variable
  variable=resource.attribute|constant
  constant=string|number
  until statement=until condition;
  binary_operator='&&' Pin|'||'|'='|'!='|'~'|'!~' expression_or_variable=expression|variable
  variable=resource.attribute|constant
  constant=string|number
  until statement=until condition;
  binary_operator='&&'|'*'|'|'|'='|'!='|'~'|'!~'

Figure 8:
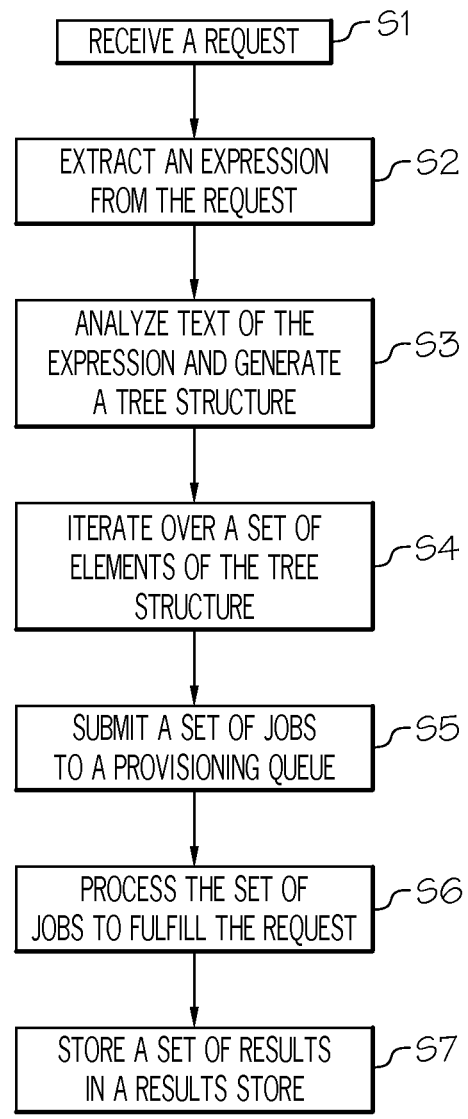
FIG. 8 depicts a method flow diagram according to an embodiment of the present invention The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

Referring now to FIG. 8, a method flow diagram according to an embodiment of the present invention is shown. As depicted, in step S1, a request to provision a set of computing resources is received in a computer memory medium. In step S2, an expression is extracted from the request. In step S3, text of the expression is analyzed, and a tree structure is generated based on the text. In step S4, a set of elements of the tree structure is iterated over to resolve a set of queries of the request. In step S5, a set of jobs is submitted to a provisioning queue based on the iterating. In step S6, the set of jobs is processed to fulfill the request. In step S7, a set of results of the processing is stored in a results store.

While shown and described herein as a computing resource query and management solution, it is understood that the invention further provides various alternative embodiments. For example, in one embodiment, the invention provides a computer-readable/useable medium that includes computer program code to enable a computer infrastructure to provide computing resource query and management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide computing resource query and management functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for computing resource query and management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for querying and managing computing resources in a networked computing environment, comprising:
   receiving, in a computer memory medium, a script-based request to provision a set of computing resources, the script-based request being in a cloud query and manipulation language (CQML) that includes an expression in an expression language implemented as an extension to a representational state transfer (REST) service that manages the computing resources;
   extracting the expression from the request;
   analyzing text of the expression and generating a tree structure that describes a structure of the expression based on the text;
   iterating over a set of elements of the tree structure to resolve a set of queries of the request;
   submitting a set of jobs to a provisioning queue based on the iterating;
   processing the set of jobs to fulfill the request; and
   storing a set of results of the processing in a results store.

2. The computer-implemented method of claim 1, further comprising:
   collecting the set of results from the results store;
   packaging the set of results as a response result object; and
   sending the response result object as a procedural input to a device executing a user script.

3. The computer-implemented method of claim 2, the request being received via the user script of an operating system-based script writer.

4. The computer-implemented method of claim 1, further comprising extracting the expression from an hypertext transfer protocol (HTTP) request and converting the expression to a text format.

5. The computer-implemented method of claim 1, further comprising evaluating any dependencies between the set of jobs in the provisioning queue, wherein an order of the queue is established to maintain the dependencies.

6. The computer-implemented method of claim 1, further comprising providing a reference to a location in the provisioning queue where the processing should commence.

7. The computer-implemented method of claim 1, further comprising:
   monitoring statuses of the set of jobs in the provisioning queue; and
   evaluating whether changes in the statuses enable subsequent provisioning actions.

8. The computer-implemented method of claim 1, the networked computing environment comprising a cloud computing environment, and the set of computing resources comprising cloud computing resources.

9. A system for querying and managing computing resources in a networked computing environment, comprising:
   a bus;
   a processor coupled to the bus; and
   a memory medium coupled to the bus, the memory medium comprising instructions to:
      receive, in a computer memory medium, a script-based request to provision a set of computing resources, the script-based request being in a cloud query and manipulation language (CQML) that includes an expression in an expression language implemented as an extension to a representational state transfer (REST) service that manages the computing resources;
      extract the expression from the request;
      analyze text of the expression and generate a tree structure that describes a structure of the expression based on the text;
      iterate over a set of elements of the tree structure to resolve a set of queries of the request;
      submit a set of jobs to a provisioning queue based on the iteration;
      process the set of jobs to fulfill the request; and
      store a set of results of the processing in a results store.

10. The system of claim 9, the memory medium further comprising instructions to:
    collect the set of results from the results store;
    package the set of results as a response result object; and
    send the response result object as a procedural input to a device executing a user script.

11. The system of claim 10, the request being received via the user script of an operating system-based script writer.

12. The system of claim 9, the memory medium further comprising instructions to extract the expression from an hypertext transfer protocol (HTTP) request and convert the expression to a text format.

13. The system of claim 9, the memory medium further comprising instructions to evaluate any dependencies between the set of jobs in the provisioning queue, wherein an order of the queue is established to maintain the dependencies.

14. The system of claim 9, the memory medium further comprising instructions to provide a reference to a location in the provisioning queue where the processing should commence.

15. The system of claim 9, the memory medium further comprising instructions to:
monitor statuses of the set of jobs in the provisioning queue; and
evaluate whether changes in the statuses enable subsequent provisioning actions.

16. The system of claim 9, the networked computing environment comprising a cloud computing environment, and the set of computing resources comprising cloud computing resources.

17. A computer program product for querying and managing computing resources in a networked computing environment, the computer program product comprising a computer readable storage device, and program instructions stored on the computer readable storage device, to:
receive, in a computer memory medium, a script-based request to provision a set of computing resources, the script-based request being in a cloud query and manipulation language (CQML) that includes an expression in an expression language implemented as an extension to a representational state transfer (REST) service that manages the computing resources;
extract the expression from the request;
analyze text of the expression and generate a tree structure that describes a structure of the expression based on the text;
iterate over a set of elements of the tree structure to resolve a set of queries of the request;
submit a set of jobs to a provisioning queue based on the iterating;
process the set of jobs to fulfill the request; and
store a set of results of the processing in a results store.

18. The computer program product of claim 17, further comprising program instructions stored on the computer readable storage device media to:
collect the set of results from the results store;
package the set of results as a response result object; and
send the response result object as a procedural input to a device executing a user script.

19. The computer program product of claim 18, the request being received via the user script of an operating system-based script writer.

20. The computer program product of claim 17, further comprising program instructions stored on the computer readable storage device to extract the expression from an hypertext transfer protocol (HTTP) request and convert the expression to a text format.

21. The computer program product of claim 17, further comprising program instructions stored on the computer readable storage device media to evaluate any dependencies between the set of jobs in the provisioning queue, wherein an order of the queue is established to maintain the dependencies.

22. The computer program product of claim 17, further comprising program instructions stored on the computer readable storage device to provide a reference to a location in the provisioning queue where the processing should commence.

23. The computer program product of claim 17, further comprising program instructions stored on the computer readable storage device to:
monitor statuses of the set of jobs in the provisioning queue; and
evaluate whether changes in the statuses enable subsequent provisioning actions.

24. The computer program product of claim 17, the networked computing environment comprising a cloud computing environment, and the set of computing resources comprising cloud computing resources.

25. A method for deploying a system for querying and managing computing resources in a networked computing environment, comprising:
providing a computer infrastructure having at least one computer device that operates to:
receive, in a computer memory medium, a script-based request to provision a set of computing resources, the script-based request being in a cloud query and manipulation language (CQML) that includes an expression in an expression language implemented as an extension to a representational state transfer (REST) service that manages the computing resources;
extract the expression from the request;
analyze text of the expression and generate a tree structure that describes a structure of the expression based on the text;
iterate over a set of elements of the tree structure to resolve a set of queries of the request;
submit a set of jobs to a provisioning queue based on the iterating;
process the set of jobs to fulfill the request; and
store a set of results of the processing in a results store.

* * * * *